United States Patent
Okuyama et al.

(10) Patent No.: US 7,355,740 B2
(45) Date of Patent: Apr. 8, 2008

(54) CARD MAKING DEVICE, CARD MAKING METHOD AND RECORDING MEDIUM THEREOF

(75) Inventors: Sanae Okuyama, Miyagi (JP); Satoru Shinohara, Miyagi (JP)

(73) Assignee: Sony Corporation (JP)

( * ) Notice: Subject to any disclaimer, the term of this patent is extended or adjusted under 35 U.S.C. 154(b) by 1214 days.

(21) Appl. No.: 09/885,945

(22) Filed: Jun. 22, 2001

(65) Prior Publication Data
US 2002/0030855 A1 Mar. 14, 2002

(30) Foreign Application Priority Data
Jun. 26, 2000 (JP) .......................... P2000-191624

(51) Int. Cl.
*G06F 15/00* (2006.01)
(52) U.S. Cl. .................. 358/1.17; 358/1.18; 358/1.15; 463/30; 463/31
(58) Field of Classification Search ............... 358/1.17, 358/1.18; 463/30–31
See application file for complete search history.

(56) References Cited

U.S. PATENT DOCUMENTS

| | | | | |
|---|---|---|---|---|
| 5,410,642 A | * | 4/1995 | Hakamatsuka et al. | 358/1.14 |
| 5,617,528 A | * | 4/1997 | Stechmann et al. | 715/517 |
| 5,649,216 A | * | 7/1997 | Sieber | 715/506 |
| 5,913,542 A | | 6/1999 | Belucci et al. | |
| 6,200,216 B1 | * | 3/2001 | Peppel | 463/1 |
| 6,283,858 B1 | * | 9/2001 | Hayes et al. | 463/31 |
| 6,336,865 B1 | * | 1/2002 | Kinjo | 463/34 |
| 6,632,250 B1 | * | 10/2003 | Lynch et al. | 715/517 |
| 6,807,521 B1 | * | 10/2004 | Kurosawa et al. | 703/22 |
| 6,835,135 B1 | * | 12/2004 | Silverbrook et al. | 463/303 |

FOREIGN PATENT DOCUMENTS

GB  2 281 535 A1  3/1995

OTHER PUBLICATIONS

EPO Search Report dated Sep. 2, 2003.

* cited by examiner

*Primary Examiner*—Mark R. Milia
(74) *Attorney, Agent, or Firm*—Rader Fishman & Grauer PLLC; Ronald P. Kananen

(57) ABSTRACT

A card making device allowing easy procurement of a character card desired by the user. When specified conditions are satisfied during a game, character data for a specified character are extracted from a character data storage means by a character data extraction means, specified character data are selected by a character selection means, card layout information is input by a card layout information input means, card layout of character data selected according to card layout information is performed by a card display image information generation means and card display image information is then generated and output to a printer by means of a card display information output means.

1 Claim, 6 Drawing Sheets

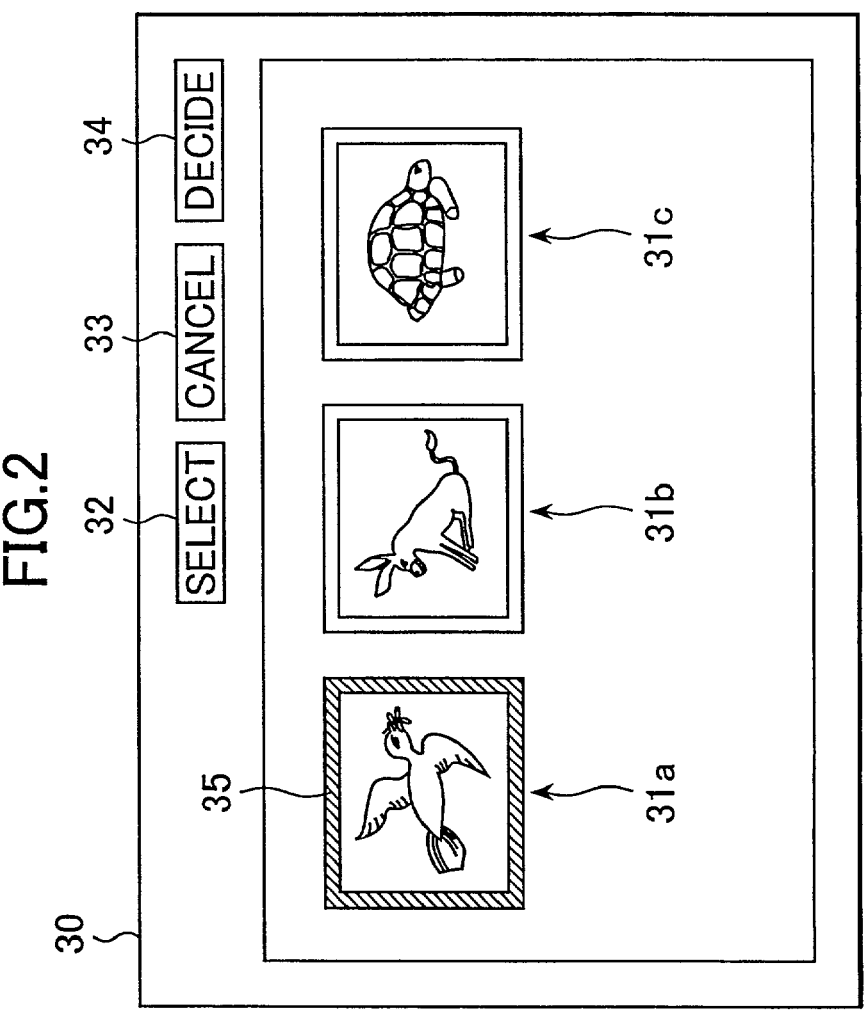

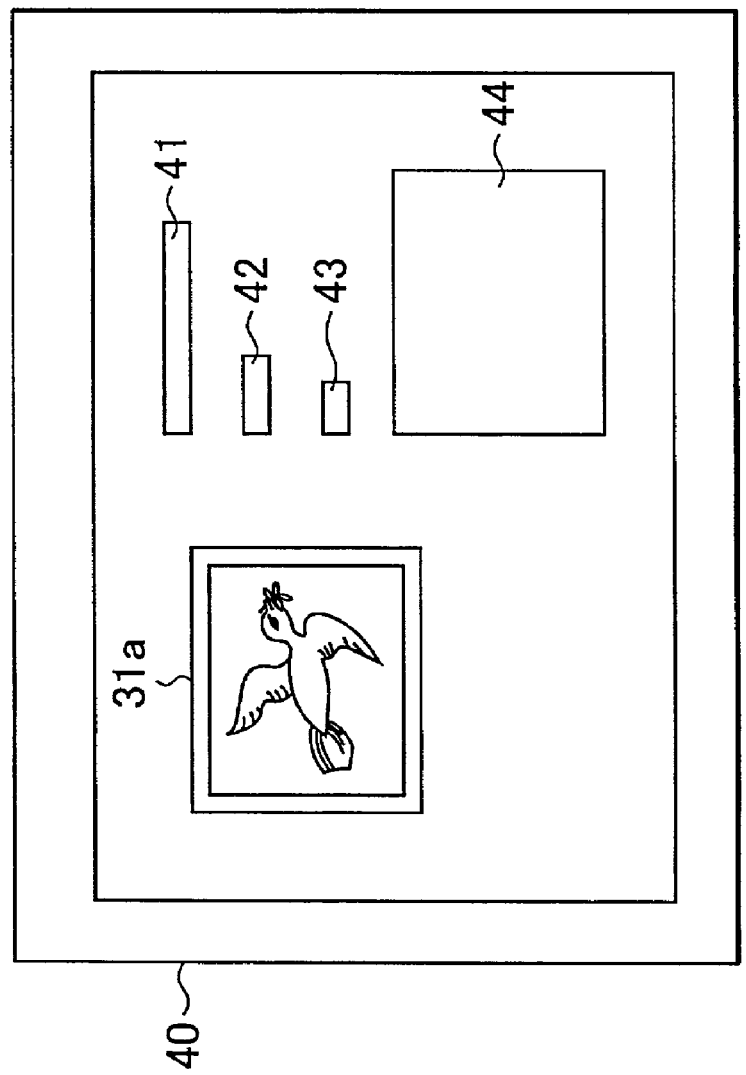

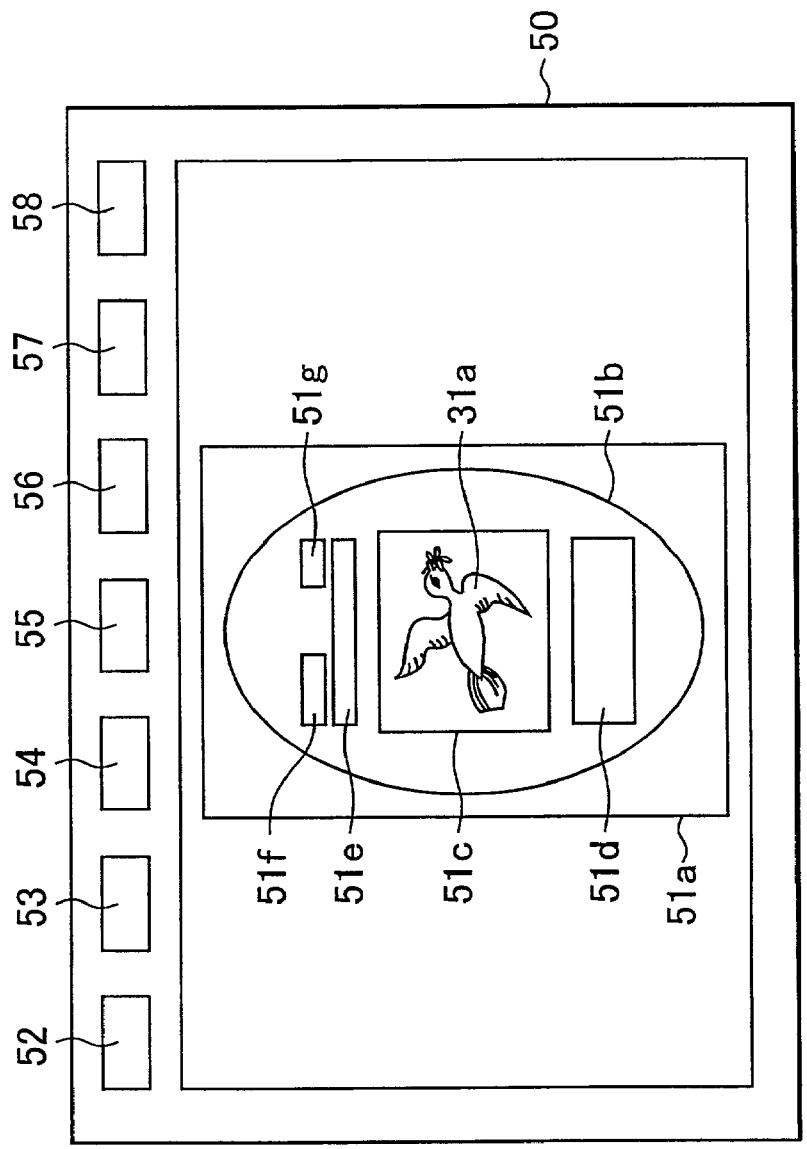

CARD MAKING DEVICE, CARD MAKING METHOD AND RECORDING MEDIUM THEREOF

BACKGROUND OF THE INVENTION

1. Field of the Invention

The present invention relates to a card making device, card making method and a computer-readable programming medium for storing a program to execute card-making by computer, and related in particular to a card making device for making cards for game characters, a card making method and a computer-readable programming medium for storing a program to execute card-making by computer.

2. Description of the Related Art

In the related art, cards of all types printed with various types of characters appearing in television games are sold in retail outlet stores. These character cards from retail outlet stores are used in card games.

However, since these cards of the related art are not directly linked to the television games and are uniformly printed in a mass production process, the problem occurred that a user found obtaining the card of a particularly desired character very difficult.

SUMMARY OF THE INVENTION

In view of the problem of the related art, the present invention has the object of providing a card making device capable of allowing the user to easily procure the card of a particular desired character.

A further object of the present invention is to provide a card making method capable of allowing the user to easily procure the card of a particularly desired character.

A further object of the present invention is to provide a recording medium stored with a program runnable on a computer to execute functions allowing the user to easily procure the card of a particularly desired character.

In order to resolve the above stated problem with the related art, the card making device for making characters cards is characterized in comprising a character data storage means stored with character data on the characters appearing in the game, a character data extraction means for extracting data on a specified character from the character data storage means, a card layout information input means to input specified card layout information for making a card layout of a character indicated on character data extracted from the character data extraction means, and a card display image information generation means to generate card display image information showing a card display image of the character shown in the character data extracted by the character data extraction means according to card layout information input by the card layout information input means, and a card display image information output means to output card display image information generated by the card display image information generation means to a printer.

The character data storage here, means stores the character data constituted by the data of the character appearing in the game, the character data extraction means extracts the specified character data from the character data storage means, the card layout information input means inputs the card layout information specifying the card layout of the character shown in the character data extracted by the character data extraction means, and the card display image information generation means generates card display image information showing a card display image of the character shown in the character data extracted by the character data extraction means according to card layout information input by the card layout information input means, and a card display image information output means outputs the card display image information generated by the card display image information generation means to a printer.

The card making method for the character cards is characterized in storing the character data constituted by the data of the character appearing in the game, extracting the specified character data, inputting card layout information specifying the card layout of the character shown in the extracted character data, generating card display image information showing a card display image placed with the character shown in the extracted character data according to the input card layout information, and outputting the generated card display image information to the printer.

The character appearing in the game can in this way be directly utilized, and the card particularly desired by the user can be freely made.

The computer-readable programming medium for storing a program to execute card-making by computer is characterized in storing the character data constituted by the data of the character appearing in the game, extracting the specified character data, extracting the specified character data, inputting the card layout information specifying the character card layout shown by the extracted character data, and generating card display image information showing a card display image placed with the character shown in the extracted character data according to the input card layout information, and outputting the card display image information to a printer.

The character appearing in the game can in this way be directly utilized, and the card particularly desired by the user can be freely made.

BRIEF DESCRIPTION OF THE DRAWINGS

FIG. 2 is a drawing of the character selection screen.

FIG. 3 is a drawing showing the character display screen.

FIG. 4 is a drawing showing the card layout generating screen.

DETAILED DESCRIPTION OF THE PREFERRED EMBODIMENTS

The embodiment of the present invention is hereafter described while referring to the accompanying work drawings.

Figure 1:
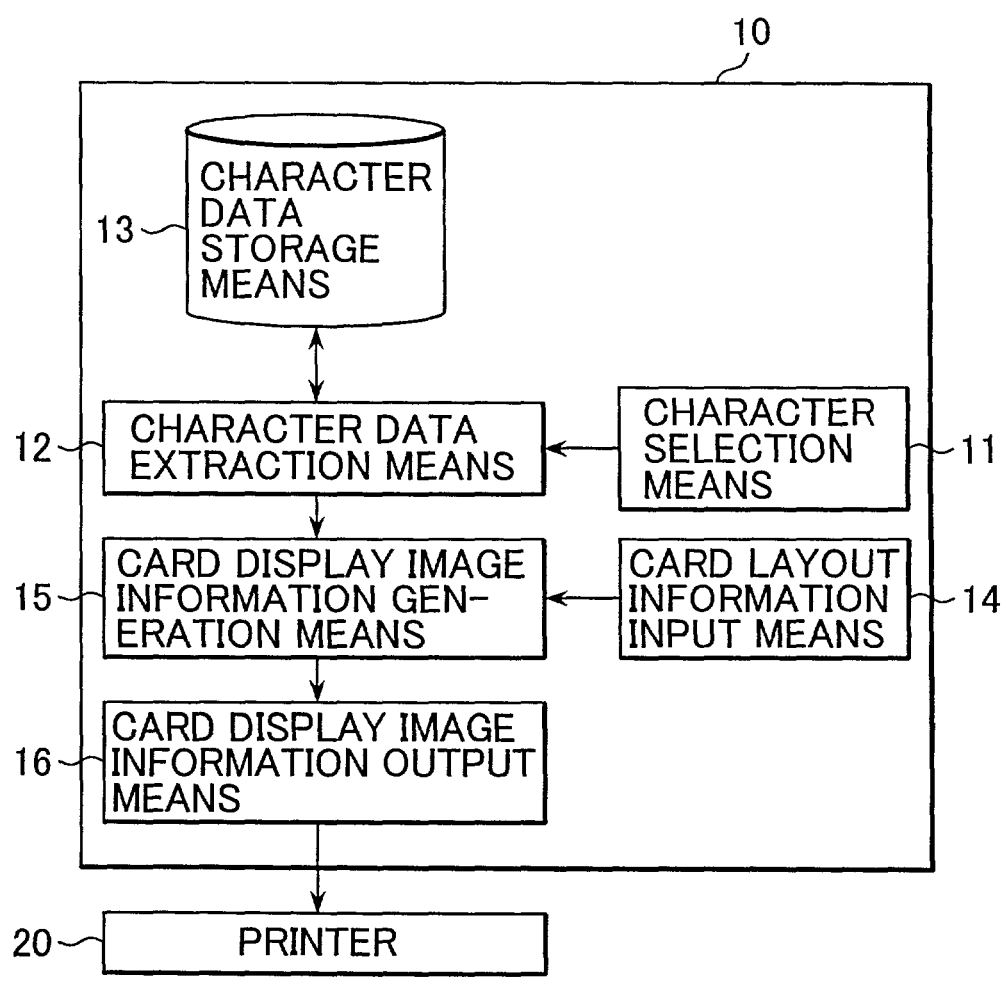
FIG. 1 is a block diagram showing the structure of the card making device.

A drawing of the structure of a card making device 10 of the embodiment is shown in FIG. 1.

A card making device 1 is comprised of a character data storage means 13 stored with character data consisting of data on the character appearing in the game, a character data selection means 11 for selecting the character used for making the card, a character data extraction means 12 for extracting specified character data from the character data storage means 13, a card layout information input means 14 for inputting card layout information for specifying the card layout of a character shown in the character data extracted by the character data extraction means 12, a card display image information generation means 15 for generating card display image information showing a card display image where the character is positioned as shown in the character data extracted by the character data extraction means 12 according to the card layout information input by the card layout information input means 14, and a card display image information output means 16 for outputting to a printer 20, the card display image information generated by the card display image information generation means 15.

The operation of the card making device 10 is explained next while referring to FIG. 1.

When specified conditions are satisfied during a game that is in progress such as winning a battle in the game, the character data extraction means 12 extracts data relating to a specified character stored in the character data storage means 13. The character data extracted here is a character satisfying specified conditions during the game, and for example is character data for a character such as the character victorious in the battle. The character data extracted in this way is displayed in sequence on the character selection screen 30 displayed in FIG. 2.

Character data 31a through 31c shown in the character data extracted by the character data extraction means 12 is displayed on the character selection screen 30. A cursor 35 for implementing the selection of this data is shown on any of the characters 31a through 31c. A select button 32 to click when selecting a selected character 31a through 31c, a cancel button 33 for canceling the selection of a character 31a through 31c, and a decide button 34 for entering the selected characters 31a through 31c are displayed together on the upper portion of the character selection screen 30.

The user selects a desired character with the cursor 35 from among the characters 31a through 31c while referring to the character selection screen 30 shown as described above, and clicks the select button 32 to trigger the character selection means 11, and select the specified character 31a through 31c. The character 31a through 31c selected in this way, is displayed on a character display screen 40 whose features are shown in FIG. 3. The selection display screen 40 of FIG. 3 shows the screen when a character 31a has been selected.

A selected character 31a is displayed on the character display screen 40 along with respectively, a character name 41 for that character 31a, parameters 42, 43 showing the strength of the character 31a, and a feature description box 44 for describing the special features of the character 31a.

When the character display screen 40 is displayed, the user refers to the contents listed on that display and decides whether or not to make a card for the selected character 31a. Here, when the user selects card making by a method not shown in the drawing, the character data of the selected character 31a is sent to the card display image information generation means 15. The card display image information generation means 15 generates card display image information based on the character data that was sent.

The card display image information is generated in accordance with the card layout generation screen 50 shown in FIG. 4.

The edit buttons 52 through 58 utilized during card layout are shown on the card layout generation screen 50. During card layout, the user clicks the desired edit buttons 52 through 58 to operate the card layout information input means 14, and positions the selected character 31a, the character name 51e of that character 31a, the parameters 51f, 51g and a feature description text 51d within the card frame 51a shown in the frame of the card displayed on the card layout generation screen 50, rewrites the line 51b, 51c, performed by coloring these items. (Information specifying this kind of character card layout is defined as card layout information.)

The card display image information generated in this way, is sent to the card display image information output means 16. Here, when the user wants to make a printing of the card displayed on the card layout generation screen 50, the card making device 10 is instructed to output a card by a means not shown in the drawing. The card display image information output means 16 therefore outputs this card display image information to the printer 20, and the printer 20 prints the contents of this card display image information on the printing paper.

Figure 5A:
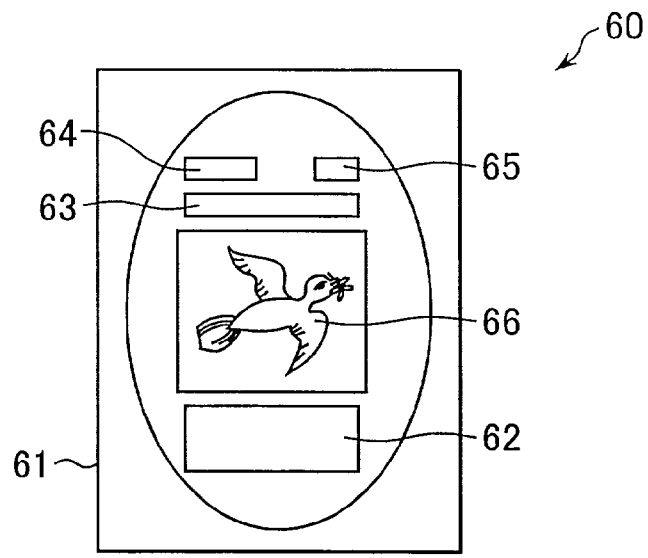
FIG. 5A is a flat view showing the printed card as the contents of the card display image information printed on printing paper.

A flat (plan) view of the contents of the card display image information printed in this way on the printing paper of the card 60 is shown in FIG. 5A.

The card 60 as shown in FIG. 5A, is comprised of a feature description box 62, a character name 63, parameters 64, 65, and a character 66 on the printing paper 61 based on the card display image information. Receiving layers, back-roto layers, and base materials such as composite paper, high quality paper, rotogravure paper, cast-coated rotogravure paper, cellulose fiber paper and foam PET may be utilized here as the printing paper 61, and the size is 50 to 100 millimeters in height×50 to 150 millimeters in width, and a thickness 0.1 to 0.8 millimeters. A geometrical pattern is formed on the side of the printing paper 61 opposite the side printed with the character 66, and a notch may be formed on a circular or elliptical pattern by precutting/simulated adhesion or perforations, etc.

Figure 5B:
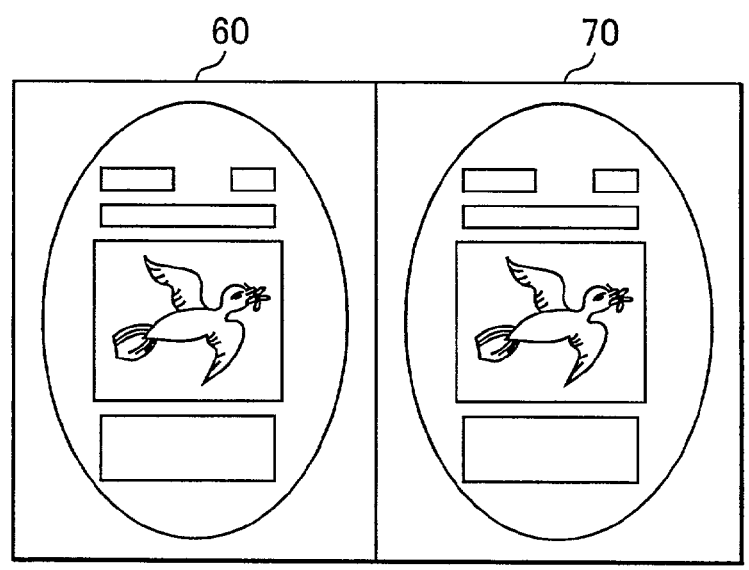
FIG. 5B is an example showing two cards printed on one sheet of printing paper.

A view showing an example of printing of two cards 60, 70 of one sheet of printing paper is shown in FIG. 5B. In this figure, the same character is printed on the cards 60 and 70 consisting of one sheet of printing paper however, two or more cards printed with other characters may also be utilized.

Figure 6:
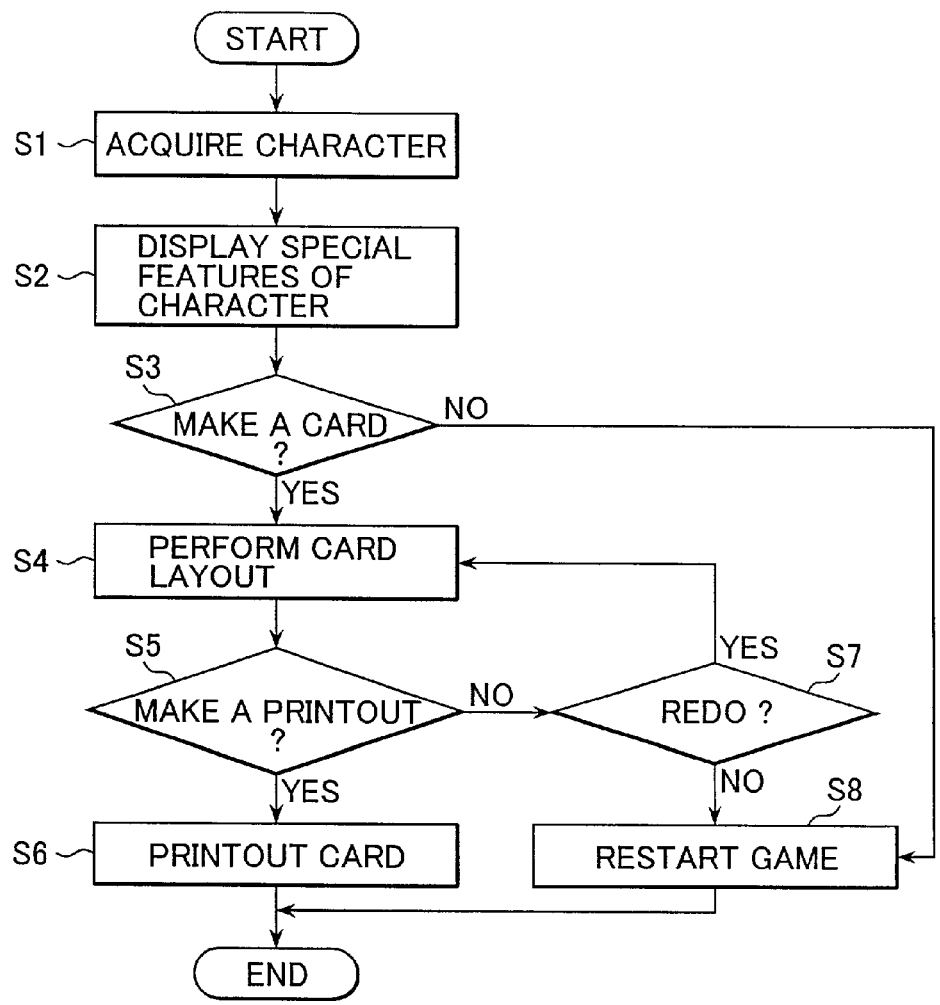
FIG. 6 is a flowchart showing the procedure for making a card utilizing the card making device of the invention.

FIG. 6 is a flowchart showing the procedure for making the cards utilizing the card making device 10 of the embodiment.

[S1] As described above, when specified conditions are satisfied during a game, the card making device 10 extracts character data on a specific character from the character data storage means 13, and displays the extracted character on the character selection screen 30 as shown in FIG. 2. Here, the user selects character data on the specific, desired character.

[S2] Special features of the character selected in step S1 are shown in the character display screen 40 shown in FIG. 3.

[S3] The user selects by a means not shown in the drawings, whether or not to make a card for the character selected in step S1. The process here proceeds to step S4 when making a card. If not making a card, the process proceeds to step S8.

[S4] The user makes a card layout for the character selected in step S1 according to the card layout generation screen 50 shown in FIG. 4.

[S5] The user selects by a means not shown in the drawings, whether or not to make a printout of the card whose layout was performed in step S4. The process here proceeds to step S4 when making of a printout was selected. The process proceeds to step S7 if making a printout was not selected.

[S8] A printout of the card is made.

[S9] The user selects by a means not shown in the drawings, whether or not to redo the card layout. The process proceeds to step S4 when redoing the card layout was selected. The process proceeds to step S8 when redoing of the card layout was not selected.

[S8] The game is restarted.

Therefore in this embodiment, the user can easily procure the card of a particularly desired character by means of the following steps of: 1. a step to extract character data of a specified character from a character data storage means 13 by using a character data extraction means 12 when specified conditions are satisfied during a game and, 2. a step to select the specified desired character data by the character selection means 11 and, 3. a step to input the character layout information by the character layout information input means 14 and, 4. a step to perform card layout of character data selected according to card layout information by the card display image information generation means 15 and generate card display image information and, 5. a step to output to the printer 20 the card display image information generated by the card display image information output means 16.

Further, since the card making can be directly linked with the television game, the card game being played and the television game can be linked together thus broadening the possibilities for entertainment.

The processing functions of the card making device 10 can be implemented by a computer. In such cases, the information for all required processing possessed by the card making device 10 are on a program recorded in a recordable medium readable by a computer. The processing is then implemented by running the program on the computer. Devices such as a magnetic recording device or semiconductor memory device maybe utilized as the computer-readable recording medium. When obtaining by way of available market distribution means, the program may be distributed and stored on a portable type recording medium such as a CD-ROM (Compact Disk Read-Only Memory) or a floppy disk, the program can also be distributed and stored in the memory device of a computer connected by way of a network, and the program also sent to other computers by way of the network. To implement by computer, the program is stored in the hard disk within the computer, and implemented by loading the program into the main memory.

Therefore, in the invention as described above, the character data on a character appearing in the game is extracted, card layout performed by utilizing the extracted character data, and the card then made so that the user can easily obtain the card of a desired character.

What is claimed is:

1. A card making device comprising:
   character data storage means adapted to store character data;
   character data selection means adapted to select specified character data, said specified character data relating to specific characters for a card;
   character data extraction means adapted to extract said specified character data from said character data storage means
      said specified character data being associated with said specific characters
      each of said specific characters being displayed on a character selection screen
      one of said specific characters displayed on said character selection screen being user-selectable,
      said character selection screen including a cursor to select said one of said specific characters a select button to trigger said character data selection means when selecting said one of said specific characters a cancel button to cancel selection of said one of said specific characters, and an enter button to enter said one of said specific characters;
   card layout information input means adapted to input card layout information,
      said one of said specific characters and card layout information being displayed on a character display screen different from said character selection screen
      said character display screen being presented upon user-selection of said one of said specific characters;
   card display image information generation means adapted to generate card display image information,
      said card display image information being displayed on a card layout generation screen different from said character display screen
      said card display image information specifying a positioning on said card of said one of said specific characters and card layout information,
      said card layout generation screen including edit buttons to operate said card layout information input means to position said one of said specific characters, and to position said card layout information;
   card display image information output means adapted to output said card display image information received from said card display image information generation means; and
   a printer adapted to produce said card, said card being a hardcopy image of said card display image information.

* * * * *